(12) United States Patent
Bearson et al.

(10) Patent No.: US 11,812,756 B1
(45) Date of Patent: Nov. 14, 2023

(54) HEATED BRINE INJECTION

(71) Applicant: THE HILLSHIRE BRANDS COMPANY, Chicago, IL (US)

(72) Inventors: Kent M. Bearson, Naperville, IL (US); Simon Hugh Politzer, Mt. Prospect, IL (US); Tasha Joy Hermes, Bartlett, IL (US); Julie Michelle McIntire, Grand Rapids, MI (US); Dejing Fu, Lisle, IL (US); Brenda M. Dismore, Somonauk, IL (US); Nicholas James Miller, Downers Grove, IL (US)

(73) Assignee: THE HILLSHIRE BRANDS COMPANY, Chicago, IL (US)

( * ) Notice: Subject to any disclaimer, the term of this patent is extended or adjusted under 35 U.S.C. 154(b) by 1,825 days.

(21) Appl. No.: 15/018,138

(22) Filed: Feb. 8, 2016

Related U.S. Application Data

(60) Provisional application No. 62/113,657, filed on Feb. 9, 2015, provisional application No. 62/113,117, filed on Feb. 6, 2015.

(51) Int. Cl.
| | |
|---|---|
| *A23B 4/28* | (2006.01) |
| *A23B 4/08* | (2006.01) |
| *A23L 13/40* | (2023.01) |

(52) U.S. Cl.
CPC ... *A23B 4/28* (2013.01); *A23B 4/08* (2013.01); *A23L 13/428* (2016.08); *A23V 2002/00* (2013.01)

(58) Field of Classification Search
CPC ......... A23C 11/029; A23C 13/00; A23L 13/03
See application file for complete search history.

(56) References Cited

U.S. PATENT DOCUMENTS

| | | | | |
|---|---|---|---|---|
| 4,663,173 | A * | 5/1987 | Clatfelter et al. | A23B 4/28 426/281 |
| 6,672,202 | B2 * | 1/2004 | Völkl | A22C 9/007 100/154 |
| 2009/0047398 | A1 * | 2/2009 | Uram et al. | A23L 13/03 426/323 |
| 2013/0084372 | A1 * | 4/2013 | Lipinski | A23L 13/03 426/281 |
| 2014/0093627 | A1 * | 4/2014 | Bender | A23L 13/428 426/281 |

OTHER PUBLICATIONS

Lagares, "Manufacturing Process for Whole Muscle cooked Meat Products: Injection of Trimmings." from Metalquimia on Aug. 27, 2010 (Year: 2010).*
McKee et al., "Marination and Brining of Poultry Products - Value Added". From Proceedings of the 57th American Meat Science Association Reciprocal Meat Conference (pp. 129-135) (Year: 2004).*

* cited by examiner

*Primary Examiner* — Nikki H. Dees
*Assistant Examiner* — Assaf Zilbering
(74) *Attorney, Agent, or Firm* — Duane Morris LLP

(57) ABSTRACT

A system and method for making a jerky meat product may include a pump to pump heated brine at a positive pressure at a desired temperature. Embodiments may also include an injector coupled to the pump to receive the heated brine and inject the heated brine into a cool meat product to elevate the meat product temperature. Embodiments may include a slicer that receives the meat product after the heated brine is injected and slices the meat product to a first thickness. A topical applicator may apply a topical application to coat an exterior of the slices and a flattener may flatten the slices to a second thickness less than the first thickness and to cause the topical application to adhere to the slices. Embodiments may further include a drying oven and/or grill to dry the slices of the second thickness to a desired moisture level.

15 Claims, 5 Drawing Sheets

HEATED BRINE INJECTION

RELATED APPLICATIONS

This application claims priority to co-pending U.S. Provisional Application entitled "System and Method for Making Jerky Food Product", Serial No. 62/113,117, filed 6 Feb. 2015, and to co-pending U.S. Provisional Application entitled "System and Method for Making Jerky Food Product", Serial No.r 62/113,657, filed 9 Feb. 2015, the entirety of each is hereby incorporated herein by reference.

TECHNICAL FIELD

The present disclosure relates generally to the field of making food products and more specifically, to systems and methods for making jerky food products.

BACKGROUND

Viscosity and solubility of a brine solution are functions of the temperature of the brine solution. At higher temperatures, the viscosity of the brine dramatically decreases and the solubility increases for most of the soluble ingredients such as sugar, etc. The temperature of brine in traditional injecting processes is normally below 45° F. Meat injection cannot occur for very high concentrations of ingredients due to the viscosity of the solution and precipitation of soluble ingredients in this low temperature.

In past processes, in order to avoid the solubility limitation and high viscosity, raw whole muscles are sliced and then mixed/tumbled with dry ingredients, liquid ingredients, and water. But this method requires intensive manual labor to separate tumbled slices and lay slices on the screen after the tumbling process. For low-temperature brine solutions, the brine needs to be diluted in order to avoid insolubility and thick viscosity issues which will require a higher pump rate to get the desired product flavor. However, purge from injected meat might not be completely absorbed in the tumbling or mixing process and will need extra drying time to reach required USDA water activity regulation and will also lead to flavor and quality inconsistencies.

SUMMARY

Methods described herein increase the temperature of brine that is injected into meat to a higher temperature, i.e., between about 50° F. and 140° F. The meat then goes through a vacuum tumbling process so the brine is absorbed in the meat and the ingredients are distributed evenly. The tumbled whole muscles are sliced, flattened, and distributed onto a screen or mat without any manual spreading and with minimal manual handling, and allowed to equilibrate before drying. Sliced meats are cooked, dried, and/or grilled to meet shelf stability and USDA requirements of lethality.

An example method in accordance with the disclosure includes heating a brine to a desired temperature, the desired temperature being chosen to cause a viscosity of the brine to be reduced and to increase solubility of certain brine components in water. The method further includes injecting the heated brine into a cool meat product, the meat product being at a temperature less than the desired temperature of the brine, such that the meat product is brought to an elevated temperature after injection, the elevated temperature being less than 140° F. Subsequent to injecting the heated brine into the meat product, the method includes slicing the meat product to slices of a first thickness. The method further includes applying a topical application to coat an exterior of the slices, and, subsequent to applying the topical application, flattening the slices to cause the topical application to adhere to the slices and to cause the slices to become a second thickness that is less than the first thickness. The method further includes drying the slices of the second thickness to a desired moisture level.

An example system in accordance with the disclosure includes a pump configured to pump heated brine at a positive pressure, the heated brine being at a desired temperature, the desired temperature being chosen to cause a viscosity of the brine to be reduced and to increase solubility of certain brine components in water. An injector coupled to the pump receives the heated brine from the pump and injects the heated brine into a cool meat product, the meat product being at a temperature less than the desired temperature of the brine, such that the meat product is brought to an elevated temperature after injection, the elevated temperature being less than 140° F. A slicer receives the meat product subsequent to the heated brine being injected into the meat product, and slices the meat product into slices of a first thickness. A topical applicator applies a topical application to coat an exterior of the slices. A flattener receives the slices subsequent to the topical application being applied, and flattens the slices to cause the topical application to adhere to the slices of the first thickness and to cause the slices to become a second thickness that is less than the first thickness. A drying oven dries the slices of the second thickness to a desired moisture level.

DETAILED DESCRIPTION

Figure 1:
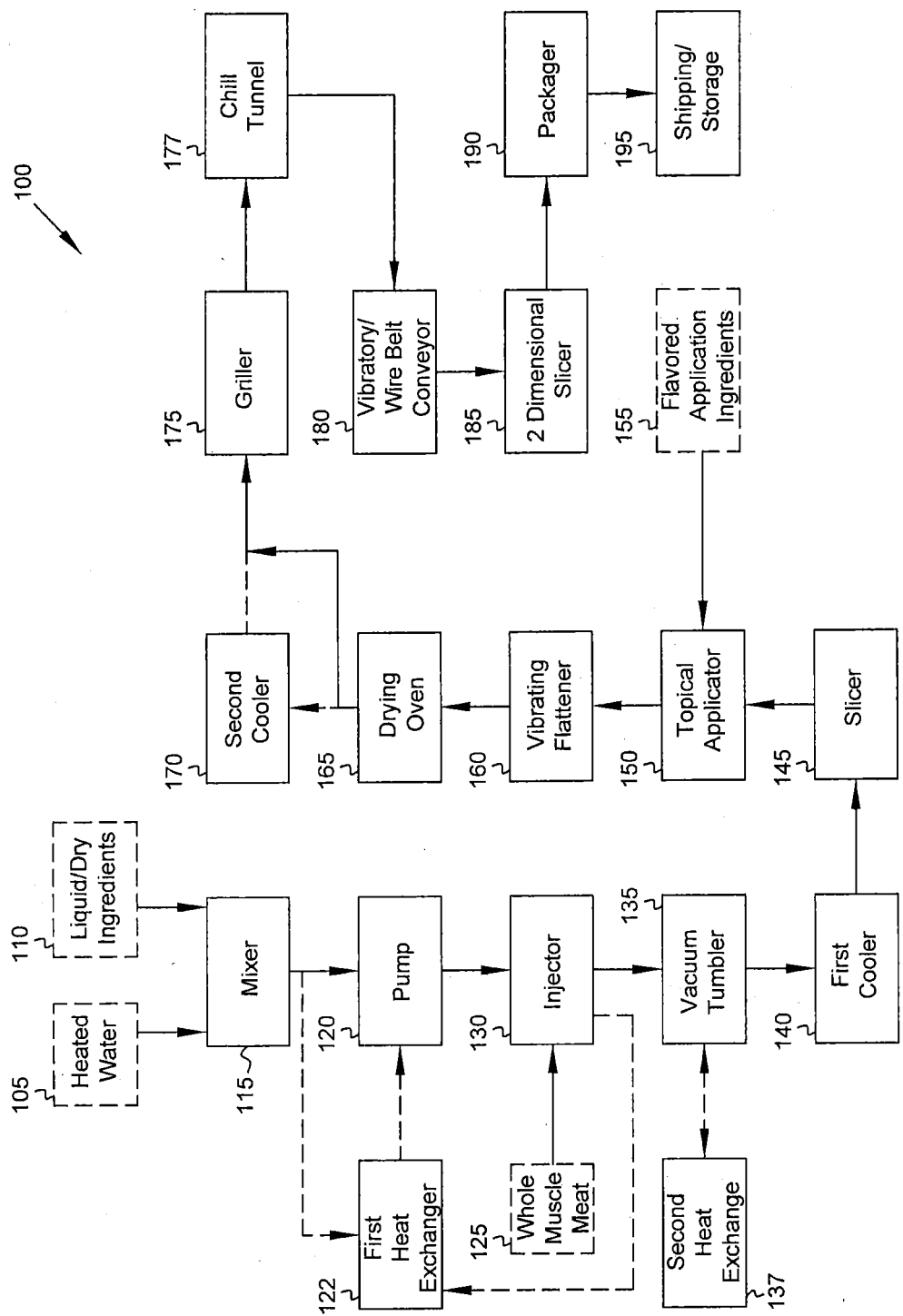
FIG. 1 illustrates an example system for preparing a jerky food product in accordance with the disclosure.

Problems associated with prior methods for producing jerky products include problems with injecting high viscosity brine, and problems in achieving uniform slice thickness, which is correlated with problems in achieving uniform drying of the slices. Non-uniform slice thickness also contributes to variability with achieving the target water activity, which is correlated with the texture of the product. For example, if a product slice is thinner than other slices in a batch, then the water activity of that slice will be lower than the water activity of the other slices in that batch. This will result in the comparatively thin slices having a harder, tougher, and less desirable texture than the other slices in the batch. An additional problem with prior art methods involves the manual labor needed to spread the marinated slices onto screens or mats. Although labor-intensive spreading methods have been used to ensure that each slice is coated in marinade, the issue of uneven flavor distribution also remains a problem. Stripping dried meat slices from the screens or mats after drying is also a problem that persists in prior art methods. Stripping requires manual labor and slows down the process, thus reducing efficiency. In addition, safety hazards posed by equipment, such as the use of multiple steps involving open gas flames has also been a problem of prior art methods.

Taking the problems associated with the prior art methods into consideration, new systems and methods were developed to eliminate the issues described above.

Systems and methods described herein solve each of these problems. The use of a more sophisticated vibrating roller, in combination with a band saw slicer, "rolls" out each slice to the same thickness, eliminating the discrepancies in slice thickness that can result from using a slicer alone. This in turn allows more uniform drying, also resulting in achieving a more accurate target water activity across the entire batch. The problem of hand spreading marinated meat slices is solved by use of the band saw slicer that deposits slices directly onto a conveyor belt, to then be transferred directly onto screens or mats. In order to ensure flavor delivery, instead of marinating individual slices, whole muscles are injected with marinade and tumbled at the beginning of the process, followed by an overnight hold. The use of drying ovens and other equipment without direct gas flame eliminates the safety concerns associated with using an open gas flame.

Problems related to the inability to inject highly viscous brine solutions may be solved by heating the brining liquid to a temperature between about 50° F. and 140° F. In traditional cold brining, the viscosity of the brining liquid is severely limited. A traditional cold brine (e.g. used at about 45° F. or lower) that may be used in making a jerky product can include 57.5% water and 42.5% dissolved solids (dry ingredients) and can sustain a 20% injection into lean beef. Solids or dry ingredients may include sugar (such as sucrose, glucose, and/or fructose), salt, starch, phosphates, dextrose, and seasonings. After injecting, cooking, and drying the jerky product produced using such a traditional brine, the jerky product may be expected to have a water activity of about 0.807, a moisture of about 30.5%, and a salt content of about 2.96%.

When using a heated brine, as described herein, much higher concentrations of dry ingredients may be used. For example, a heated brine that may be used in making a jerky product in accordance with methods described herein can include 29.1% water and 70.9% solids and can sustain a 27.5% injection into lean beef. After injecting, drying, and cooking, the jerky product produced using a heated brine in accordance with one embodiment of the present disclosure may have a water activity of about 0.807, a moisture of about 32% and a salt content of about 1.57%.

A 29.1% water solution is sufficient to dissolve large percentages of dry ingredients in a heated brine as compared to a 57.50% water solution needed to dissolve smaller percentages of dry ingredients in a cold brine. This increase in dry ingredients in the heated brine allows for a more concentrated flavor in the brine. In addition, the jerky product produced using the heated brine has a lower salt content and a higher moisture content than the traditional jerky product, both of these attributes may be desirable.

FIG. 1 illustrates an example system 100 for preparing a jerky food product in accordance with the disclosure. The system 100 includes a mixer 115. The mixer 115 is configured to receive a base liquid 105 (e.g., water) and liquid and/or dry ingredients 110 (e.g., seasonings, sugar, salt, etc.). The mixer 115 combines the base liquid 105 and the ingredients 110 until a soluble brine mixture is obtained. The mixer 115 may be an industrial mixer such as a hydrofoil impeller, a clean edge blade impeller, a paddle or ribbon-style agitator, a heavy-duty blender, or another industrial mixer. Examples of suitable mixers have been available under the brand name LIGHTNIN® manufactured by SPX Flow Technology. As will be discussed below, heated water may be used as the base liquid 105 for the brine mixture in order to provide benefits that are not provided by cool brines (e.g., brines at temperatures of 45° F. or less) that have been used in previous marinating/pickling processes.

The brine mixture is received from the mixer 115 at a pump 120. The pump 120 then pumps the brine mixture to an injector 130. The injector 130 may be, for example, a needle-manifold meat injector, a conveyor belt-style brine injector, or a walking beam-style brine injector. An example of a suitable injector has been available under the brand name WOLF-TEC. By using the heated brine mixture, the pump can more easily pump the brine to the injector 130. A first heat exchanger 122 is coupled with or integrated with the pump 120. The first heat exchanger 122 may heat the brine received from the mixer 115 prior to the pump 120 pumping the brine to the injector 130. In addition, the first heat exchanger 122 may receive some of the cooled brine that was not absorbed by the meat during injection, and heat that unabsorbed cooled brine to the desired heated brine temperature. The injector 130 receives meat (e.g., whole muscle meat with little or no fat or cartilage) 125 and proceeds to inject the meat with the heated brine mixture. The injector may inject the brine with multiple needles.

Subsequent to injecting the meat with the brine mixture, the meat may be conveyed to a vacuum tumbler 135. The vacuum tumbler 135 may be, for example, a jacketed vacuum tumbler, or an angled-drum vacuum tumbler. An example of a suitable vacuum tumbler 135 has been available under the brand name AMFEC. If all of the brine is not fully absorbed by the meat in the injector 130, some of the unabsorbed brine may be added to the tumbler 135. The meat may be tumbled for about 30-120 minutes at a pulled vacuum of at least 25″ Hg below atmospheric pressure at sea level. In other embodiments, the meat may be tumbled in a pulled vacuum of about 25″-29″ Hg below atmospheric pressure at sea level with absolute pressure between about 65 millibar (corresponding to 29″ Hg of vacuum) and 200 millibar (corresponding to 25″ Hg of vacuum), and tumbled at about 7-10 rpm for 30-120 minutes in order for the meat to absorb the brine and to cool the meat. Final meat temperature may be in a range of about 30° F. - 120° F. A second heat exchanger 137 may be coupled with or integrated with the vacuum tumbler 135. For example, the tumbler 135 may include a fluid-filled jacket coupled to the second heat exchanger 137.

Subsequent to tumbling the meat, the whole muscles may be dumped into vats and stored in a first cooler 140 at a temperature from 28° F.-40° F. for up to 72 hours, depending on the embodiment.

After the meat has cooled in the first cooler 140, the meat is sliced in a slicer 145. The slicer 145 may be a band saw slicer (such as a dual-headed slicer, or a pendulum slicer). An example of a suitable slicer 145 has been available under the brand name GROTE. In one embodiment, the meat is sliced to a thickness greater than the final target thickness. For example, if the target thickness of the final product is about 3-5 mm, depending on product specifics, the meat may be sliced to a thickness of about 6 mm to about 10 mm with the slicer 145. As will be discussed below, a vibrating flattener 160 may be used to flatten the meat to the target thickness.

Subsequent to slicing the meat, flavored topical application ingredients 155 are applied to the meat with a topical applicator 150. The sliced meat may be conveyed to the topical applicator 150 on a conveyor belt. The topical applicator 150 may be a waterfall flavor dispenser, a belt-type flavor dispenser, or a plate distributor and feeder system for topical application. Examples of suitable dispensers have been available under the brand names HEAT AND CONTROL, SPRAY DYNAMICS, and SCARFFEEDER. The topical application target may be about 1-5% of the weight of the meat. The topical application increases solid contents of the brined meat, which may improve meat texture by making it softer and more tender while achieving a lower water activity during drying.

Upon applying the topical application ingredients 155 to the sliced meat, the sliced meat may be conveyed to a vibrating flattener 160 on a flattening belt. The meat slices move under or between multiple vibrating rollers of the vibrating flattener 160. The vibrating flattener 160 may be, for example, a kneading drum flattening system or a massaging belt flattener. An example of a suitable flattener has been available under the brand name MAREL PLATINO®. The vibrating flattener may be set to about 3-5 mm thickness, for example, depending on product specifics, and rolls each slice to the target thickness. The flattening may ensure a more consistent slice target thickness (e.g., 5 mm) rather than slicing the meat to the target thickness with the slicer 145.

By applying the topical application ingredients 155 with the topical applicator 150 prior to the flattening, the topical application ingredients 155 may be better prevented from falling off the meat during drying since the topical application 155 is vibrated into the muscle, rather than just being pressed by hand, which has been done in past processes. Flattening machines have not been previously used for flattening and pressing additives into meat at the same time.

After the sliced meat is flattened, the vibrating flattener 160 may distribute flattened slices onto a temperature-resistant surface. The flattened slices are then transferred to a drying oven 165. In an embodiment, after drying to a desired water activity, the dried slices are then passed through a griller 175. In another embodiment, the flattened slices may be transferred to a second cooler 170 to await further processing or for holding. In an embodiment, the flattened slices may be held in the second cooler 170 for up to about 48 hours before being sent to the griller 175.

When the sliced meat has finished grilling, the screens or mats and are conveyed through a chill tunnel 177 and chilled to a temperature of about 70° F.-80° F. After passing through the chill tunnel 177, the chilled slices are conveyed to a vibratory and/or wire belt conveyor 180 for stripping the meat slices off the screens or mats. The vibratory or wire belt conveyor 180 may also shake any loose topical application and/or tiny meat product from the larger grilled meat slices. During the stripping process, the product temperature is maintained between about 70° F.-80° F.

Upon the finished food product being stripped from the screens or mats with the vibratory or wire belt conveyor 180, the finished product slices are sent through a two-dimensional slicer 185 to be cut into smaller pieces (e.g., about 1.5"-3" width). The smaller pieces may then be conveyed to a multi-head scale and dropped into 1.5- to 6-ounce pouches using a packager 190. The pouches are then gas flushed, sent through a metal detector (not shown), packed into cases, palletized, and staged in a shipping/storage facility 195 for distribution. Oxygen scavenger pouches may be added to the pouches prior to the pouches being gas flushed.

Figure 2:
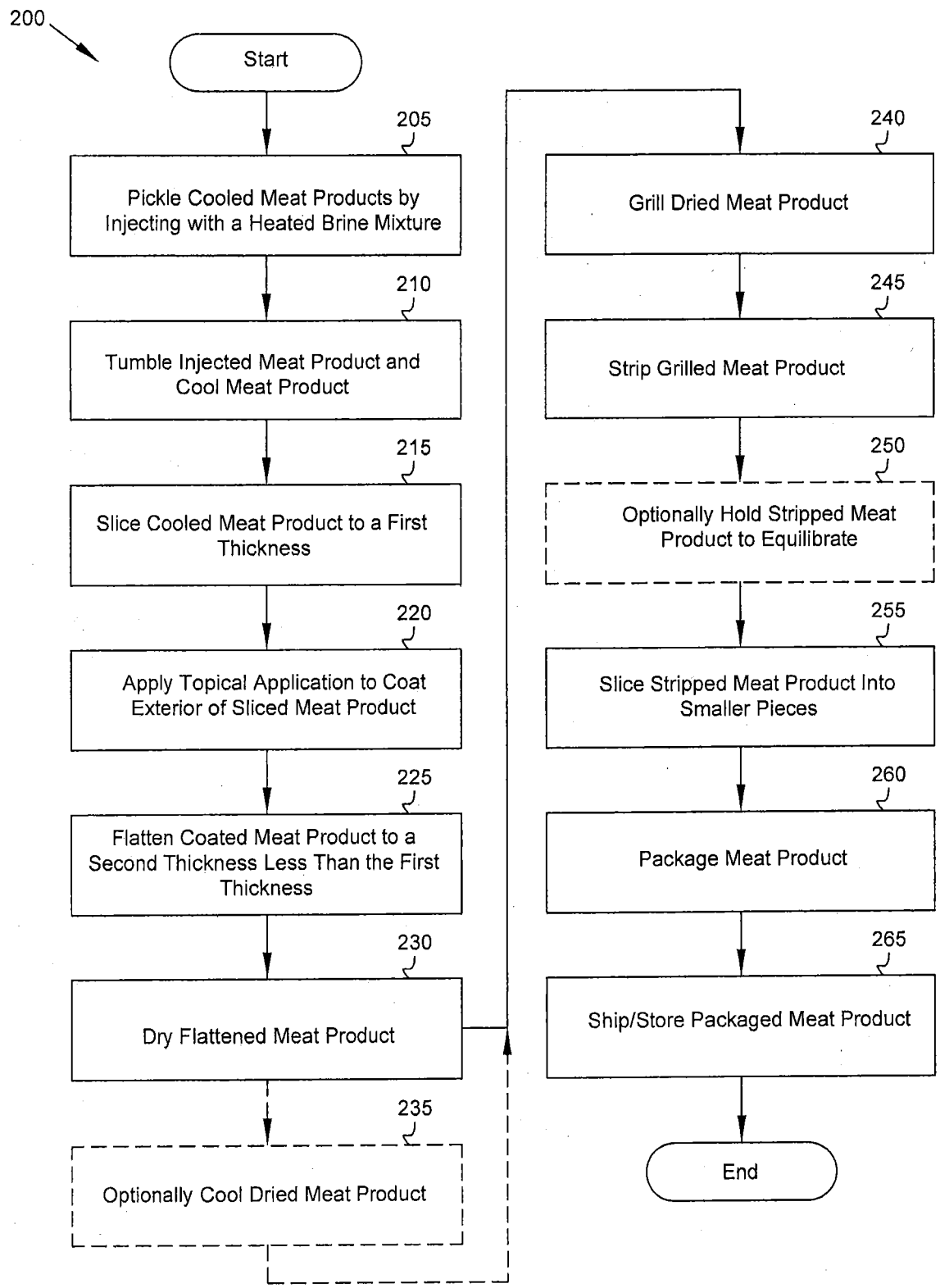
FIG. 2 illustrates an example process for preparing a jerky food product in accordance with the disclosure.

FIG. 2 illustrates an example process 200 for preparing a jerky food product in accordance with the disclosure. The process 200 may be performed using the system 100 of FIG. 1. The process 200 is exemplary only and stages may be rearranged, modified and/or omitted. The process 200 will now be described with further reference to the elements of the system 100.

Figure 3:
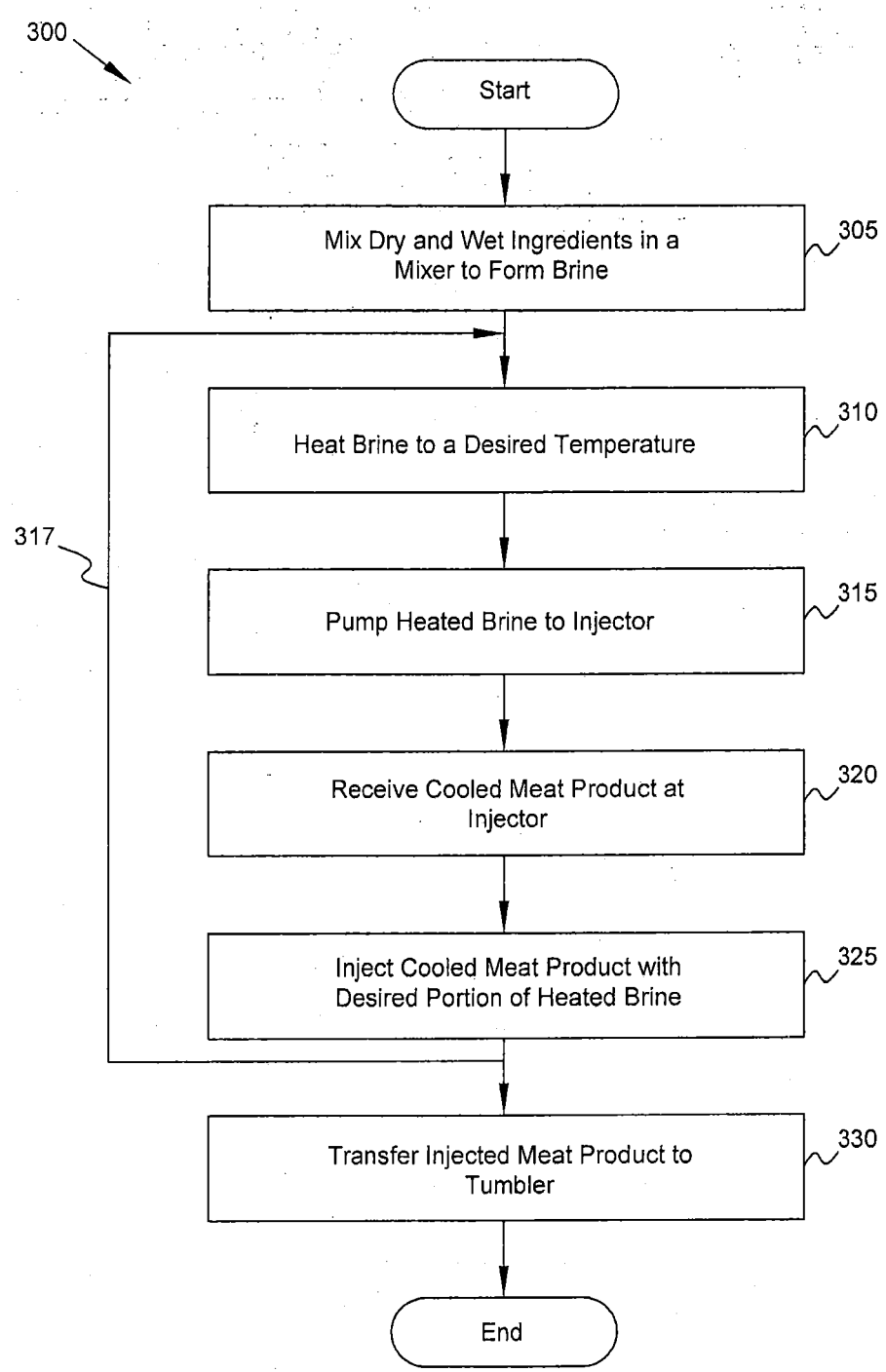
FIG. 3 illustrates an example of a brining process that may be used in the example process of FIG. 2.

The process 200 may begin at stage 205 where a cooled meat product is pickled by being injected with a heated brine mixture. FIG. 3 illustrates an example of a brining process 300 that may be used at the stage 205 in the example process 200 of FIG. 2. With further reference to FIG. 3, the process 300 may start at stage 305 where wet ingredients (e.g., the heated water 105 and any liquid flavorings) and dry ingredients are measured out and mixed in the mixer 115 to form the brine. In an embodiment, the wet ingredients may be added first, and then the dry ingredients may be added. The brine may be mixed for about 2-30 minutes, depending on the type of ingredients in the brine. The solid ingredients may be added slowly to the mixer 115 while the mixer 115 is agitating the wet ingredients. Depending on the type of wet and dry ingredients being mixed, the order in which the ingredients are added to the mixer 115 may be important, as known to those skilled in the art of making brines.

At stage 310, the brine mixture is heated by the first heat exchanger 122, if needed, to a desired temperature. If the heated water 105 is heated sufficiently to reach a desired finished heated brine temperature, then no heating may be needed. In one example, the water is preheated to about 130° F. when mixed with the liquid/dry ingredients 110. The combined brine mixture may be heated to a finished temperature range of about 50° F.-140° F., or a range of about 70° F.-120° F., or a range of about 75° F.-85° F.

As discussed above, the elevated temperature of the brine allows for the use of a larger amount of solids in the brine, e.g., sugars, seasonings, etc. However, increased temperature of the brine could cause problems with micro-organisms. Microbiologic growth may occur at temperatures as low as 50-100 F. However, with high concentration solutions, the water activity for the brine is normally below 0.85 which should inhibit the majority of microbiological growth. It is believed that the finished brine temperature may be in a range from about 50° F.-140° F., from about 70° F.-120° F. or from about 75° F.-85° F.

Figure 4:
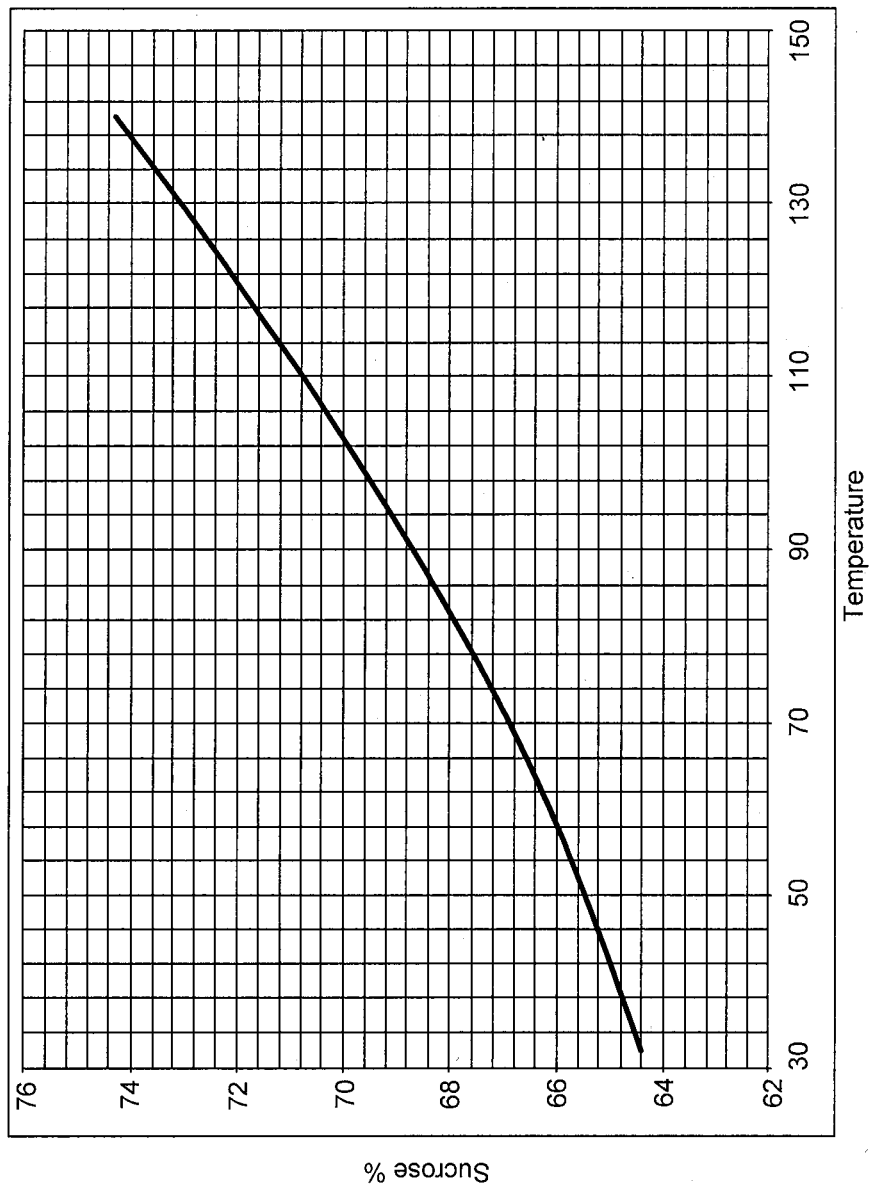
FIG. 4 shows an example solubility curve illustrating the solubility of sucrose in water for various water temperatures.

As is known in the art, the solubility of a given solute in a given solvent typically depends on temperature. For many solids dissolved in water, the solubility increases with temperature up to 100° C. FIG. 4 shows a solubility curve for sucrose in water. Table 1 below lists test data used to derive the solubility curve of FIG. 4.

TABLE 1

| Temp. F. | Solubility % |
|---|---|
| 32 | 64.447 |
| 50 | 65.4 |
| 68 | 66.718 |
| 86 | 68.289 |
| 104 | 70.1 |
| 122 | 72.115 |
| 140 | 74.263 |

The increased solubility of the water allows more solids to be dissolved in the water and prevents precipitation of the solids upon cooling of the brine. At stage 315, the pump 120 pumps the heated brine mixture to the injector 130. In addition to increasing the solubility of water in the brine, the elevated brine temperature reduces the viscosity of the brine. Using unheated brine, the injecting may require a special pump and possibly large diameter needles and, in addition, the brine may not disperse well in the meat. The reduced viscosity of the heated brine allows the brine to better diffuse through muscle tissue.

Tests were conducted in which a pump torque required to pump various brine mixtures at various temperatures and viscosities was measured, while at the same time viscosity data was collected using a viscometer attached to a spindle of a pump. Table 2, Table 3 and Table 4, below, list results of these viscosity tests for first, second, and third brine mixtures, respectively. The first brine mixture is the thinnest of the three brines, exhibiting measured viscosities in a range from about 200 cp to about 260 cp at 40° F. for pump speeds from 20 RPM to 100 RPM. The second brine is a medium thickness brine exhibiting measured viscosities in a range from about 600 cp to about 640 cp at 41° F. for pump speeds from 100 RPM to 5 RPM. The third brine is the thickest of the three brines, exhibiting measured viscosities in a range from about 4800 cp to about 5100 cp at 42° F. for pump speeds from 100 RPM to 1 RPM.

TABLE 2

First Brine Mixture

| RPM | 40 F. | | 72 F. | | 120 F. | |
| --- | --- | --- | --- | --- | --- | --- |
| | Viscosity (cp) | % Torque | Viscosity (cp) | % Torque | Viscosity (cp) | % Torque |
| 0.5 | NMF | NMF | NMF | NMF | NMF | NMF |
| 1 | NMF | NMF | NMF | NMF | NMF | NMF |
| 2.5 | NMF | NMF | NMF | NMF | NMF | NMF |
| 5 | NMF | NMF | NMF | NMF | NMF | NMF |
| 10 | NMF | NMF | NMF | NMF | NMF | NMF |
| 20 | 208 | 1.3 | NMF | NMF | NMF | NMF |
| 50 | 230 | 3.6 | 96 | 1.5 | NMF | NMF |
| 100 | 259.2 | 8 | 134.4 | 4.2 | 70.4 | 2.2 |

TABLE 3

Second Brine Mixture

| RPM | 41 F. | | 72 F. | | 120 F. | |
| --- | --- | --- | --- | --- | --- | --- |
| | Viscosity (cp) | % Torque | Viscosity (cp) | % Torque | Viscosity (cp) | % Torque |
| 0.5 | NMF | NMF | NMF | NMF | NMF | NMF |
| 1 | NMF | NMF | NMF | NMF | NMF | NMF |
| 2.5 | NMF | NMF | NMF | NMF | NMF | NMF |
| 5 | 640 | 1 | NMF | NMF | NMF | NMF |
| 10 | 608 | 1.9 | NMF | NMF | NMF | NMF |
| 20 | 608 | 3.8 | 224 | 1.3 | NMF | NMF |
| 50 | 614 | 9.6 | 192 | 3 | 102.4 | 1.6 |
| 100 | 608 | 18.9 | 214.4 | 6.7 | 124.8 | 3.9 |

TABLE 4

Third Brine Mixture

| RPM | 42 F. | | 72 F. | | 120 F. | |
| --- | --- | --- | --- | --- | --- | --- |
| | Viscosity (cp) | % Torque | Viscosity (cp) | % Torque | Viscosity (cp) | % Torque |
| 0.5 | NMF | NMF | NMF | NMF | NMF | NMF |
| 1 | 5120 | 1.6 | NMF | NMF | NMF | NMF |
| 2.5 | 4992 | 3.9 | NMF | NMF | NMF | NMF |
| 5 | 4992 | 7.8 | 768 | 1.2 | NMF | NMF |
| 10 | 4960 | 15.6 | 736 | 2.3 | NMF | NMF |
| 20 | 4960 | 31 | 704 | 4.4 | 176 | 1.1 |
| 50 | 4838 | 75.6 | 646 | 10.1 | 179 | 2.8 |
| 100 | maxed out | maxed out | 643 | 20.1 | 204.8 | 6.4 |

At some lower pump speeds, the viscometer was unable to measure the viscosity of the brine due to lack of precision. These portions of the Tables 2, 3, and 4 are marked with NMF indicating that no meaningful figure was derived. As can be seen from each of the Tables 2, 3, and 4, the pump torque is decreased using higher temperature brines (72° F. and 120° F. brines were tested) due to decreased viscosity. As can be seen in Table 4, it would be impossible to pump the third and thickest brine at 42° F. In contrast, the viscosity, and hence the torque required to pump the brine, gets much lower at the increased brine temperatures of 72° F. and 120° F. as illustrated in Tables 2, 3, and 4.

Returning to FIG. 3 (with additional references to FIG. 1) at stage 320, the cooled whole-muscle meat product 125 is received at the injector 130. The meat may be received at a temperature of 40° F. or less. At stage 325, the cooled whole-muscle meat product 125 is injected with the heated brine mixture. In one embodiment, the meat is conveyed in large pieces into the injector machine 130 and the pump 120, which may be a positive displacement pump, pumps the heated brine through needles into the meat. The target pickup of the brine may be about 30% by weight or in a range from about 10% to 50% by weight. After the injection with the heated brine, the meat should be above 40° F., but below 140° F., with an exemplary, non-limiting range from about 50° F. to 140° F.

Not all the brine that is pumped to the injectors 130 may be absorbed by the meat. The brine that is not absorbed by the meat may be cool compared to the original heated brine that was pumped and injected into the meat. As indicated by arrow 317 in FIG. 3, some of the cooled brine not absorbed by the meat may be recycled to the first heat exchanger 122 and reheated at stage 310 for re-injection.

After injection with the heated brine at stage 325, the injected meat is transferred, at stage 330, to the vacuum tumbler 135. Some of the brine that is not absorbed during the injection at stage 325 may be transferred with the meat to the vacuum tumbler 135. The process 300, and the stage 205 of the process 200, concludes after the injected meat is transferred to the vacuum tumbler 135.

Returning now to the process 200 of FIG. 2, at stage 210, the injected meat and, in an embodiment, some of the unabsorbed brine is tumbled in the vacuum tumbler 135. As discussed above, the vacuum tumbler 135 may pull a vacuum of about 25" Hg to 29" Hg below atmospheric pressure at sea level with absolute pressure between about 65 millibar for 29 "Hg of vacuum and about 200 millibar for 25" Hg of vacuum, where vacuum level may change based on the altitude of the location. Pulling a vacuum allows for better brine absorption by the meat. Details of the tumbling process will be discussed with further reference to FIG. 5, which illustrates an example of a tumbling process 500 that may be used at stage 210 in the example process 200 of FIG. 2.

Figure 5:
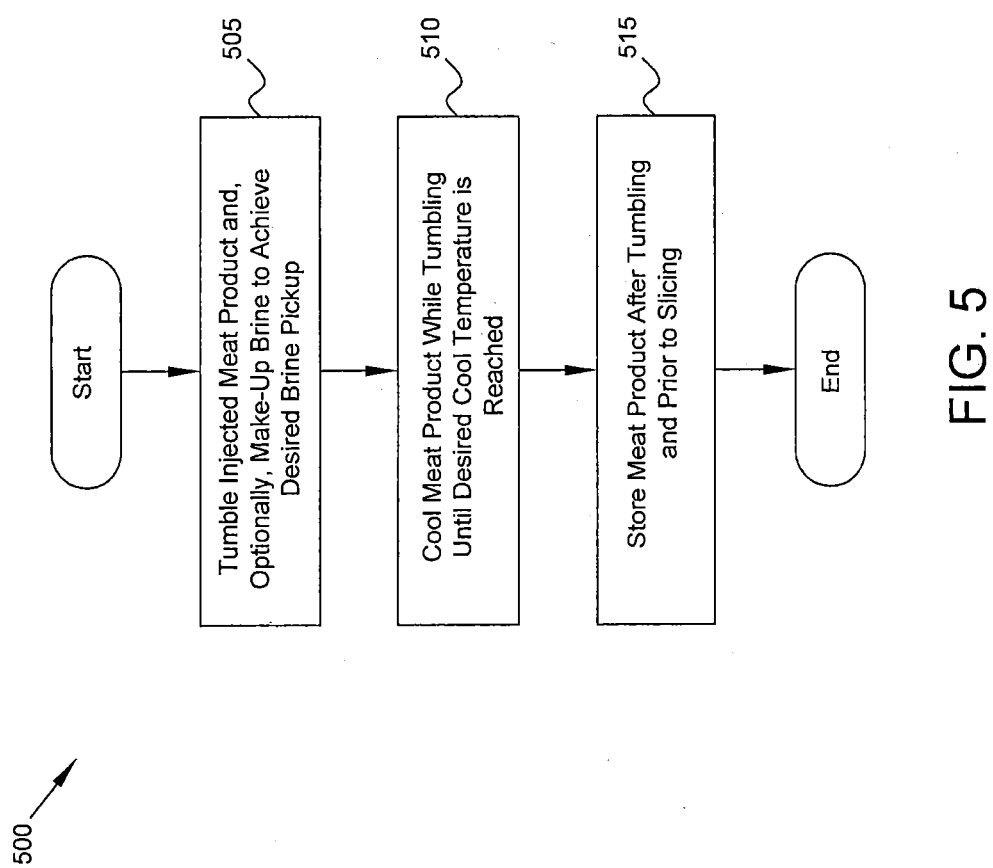
FIG. 5 illustrates an example of a tumbling process that may be used in the example process of FIG. 2.

With reference now to FIG. 5, at stage 505, the vacuum tumbler 135 tumbles the meat and extra brine (make-up brine) to achieve a desired brine pickup. The vacuum tumbler may tumble at a speed of about 7-10 RPM (note, tumbling speed may be changed based on, for example, the tumbling size) for a time in a range from about 30-120 minutes, depending on the type of meat and brine being tumbled.

At stage 510, while the meat and make-up brine are being tumbled, the vacuum tumbler may pull a vacuum above 29" Hg of vacuum, resulting in an absolute pressure of about 8 millibar or 6 Torr, in order to cool the meat that has been warmed by the heated brine injection as described above. At absolute pressure below about 8 millibar or about 6 Torr, evaporative cooling occurs within the meat naturally. At absolute pressure above about 8 millibar or about 6 Torr, supplemental cooling may be needed to adequately cool the meat. The meat temperature may be monitored from time to time during the tumbling process until a desired temperature is reached, but this may not be necessary. The desired meat temperature may be about 30° F.-50° F. After reaching the desired temperature, the unabsorbed brine may be discarded.

After tumbling for a sufficient time to reach the desired meat temperature, or after a measurement ensures the meat has reached the desired temperature, the process 500 continues at stage 515 where the tumbled meat is stored in the first cooler 140. The meat may be stored in the first cooler 140 for up to about 72 hours at a temperature from about 32° F. to about 40° F. After storing the meat in the first cooler 140 at stage 515, the process 500 is concluded.

Returning attention to FIG. 2 (with additional references to FIG. 1), at stage 215, the cooled and injected meat is sliced to a first thickness with the slicer 145. The large pieces of meat may be loaded, automatically or manually, to a chute of the slicer 145 which, in an embodiment, is a band saw slicer. The slicer 145 may slice the large pieces of meat into slices of a thickness greater than the target thickness, as discussed above. In the past, it has proven difficult to maintain consistent thickness when slicing raw meat due to the graininess of the meat and other factors. For this reason, the meat is sliced thicker than the target thickness and the flattener 160 is used to flatten the slices to a precise, consistent thickness.

If the target thickness is 3-5 mm, depending on product specifics, the slicer 145 may slice the meat to be 6 mm to 10 mm thick. Typically, as the slicer 145 is running, a conveyor belt is running under the exit of the slicer 145 and the sliced pieces are collected on the conveyor belt and conveyed to the topical applicator 150.

Upon slicing the meat, the process 200 continues to stage 220, where the flavored topical application ingredients 155 are applied to the meat slices with the topical applicator 150. The topical applicator 150 may convey the meat slices under a waterfall flavor dispenser (e.g., the topical applicator 150 may be a belt-type flavor dispenser, or a plate distributor and feeder system) for topical application. The topical application target may be about 1%-3% of the weight of the meat. Controlled topical application may increase solid contents of the final food product, which may improve meat texture by making the final food product softer and more tender while achieving a lower water activity.

At stage 225, the vibrating flattener 160 flattens the seasoned meat slices between or under one or more vibrating rollers. The vibrating rollers may be positioned such that the meat is flattened to a desired thickness such as, for example, 5 mm. This flattening may ensure a more consistent slice thickness. In addition, by applying the topical application ingredients 155 prior to the flattening, the topical application ingredients 155 may be better prevented from falling off during later stages since the topical application ingredients 155 are vibrated into the muscle, rather than just being pressed by hand, for example.

After flattening, the vibrating flattener 160 may deposit the flattened slices onto temperature resistant screens or mats and a conveyor may transfer the slices and the screens or mats to the drying oven 165 for drying at stage 230. The screens or mats and the flattened slices may be arranged manually or automatically onto racks and then transferred to the drying oven 165 for drying. The drying at stage 230 may be performed such that a target water activity of about 0.75 to about 0.90 is achieved.

Water activity may be measured from time to time at stage 230 for a number of samples from each rack. For example, three samples per rack may be measured, a first sample from an upper portion or a top of the rack, a second sample from a middle portion of the rack, and a third sample from a lower portion or bottom the of rack. All three samples are ground separately and tested to determine the water activity, for example. The average time the product spends in the drying oven 165 to reach the target water activity may be about 3.5 hours, or in a range from 1.0 to 8.0 hours depending upon the characteristics of the meat (e.g., slice thickness).

After drying at stage 230, in an embodiment the screens or mats and meat slices are passed to a griller 175 at stage 240. In another embodiment, the screens or mats and meat slices are passed, at stage 235, to the second cooler 170 for cooling prior to grilling, as discussed above. Subsequent to grilling the sliced meat at stage 240, the grilled meat is cooled in the chill tunnel 177 to about 70° F. to 80° F. and then stripped from the screens or mats, after the meat has cooled, at stage 245. The stripping may comprise transferring the grilled meat on the screens or mats to the vibratory or wire belt conveyor 180 which shakes the meat slices off the screens or mats. The stripping may also shake small detached pieces of meat and loose topical application from the grilled slices, which may be discarded. During the cooling and stripping process at stage 245, the temperature of the meat drops to about 70° F. to 80° F.

Subsequent to cooling and stripping the grilled meat slices at stage 245, the stripped meat slices may be optionally held at stage 250 to equilibrate the meat slices prior to further processing. The grilled meat slices may be equilibrated at stage 250 for up to about 48 hours.

Upon the finished food product being stripped with the vibratory or wire belt conveyor 180 at stage 245, and optionally held to equilibrate at stage 250, the finished product slices are sent through the two-dimensional slicer 185 at stage 255 to cut the slices into smaller pieces (e.g., about 1.5″-3″ width).

The smaller pieces may then be conveyed to the packager 190 to be packaged, as shown in stage 260. The packager 190 may include a multi-head scale that measures the smaller pieces and then the packager 190 drops the measured portions into 1.5 to 6 ounce pouches, for example. The pouches may then be gas flushed at the packager 190, sent through a metal detector, packed into cases, palletized, and, at stage 265, staged in a shipping/storage facility 195 for distribution. Oxygen scavenger pouches may be added to the pouches prior to the pouches being gas flushed at stage 260.

It is important to note that the construction and arrangement of the elements of the products and methods as shown in the exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the various embodiments. Accordingly, all such modifications are intended to be included within the scope of the present disclosure as defined in the appended claims. The order or sequence of any process or method steps may be varied or re-sequenced according to alternative embodiments. Other substitutions, modifications, changes, and/or omissions may be made in the design, operating conditions, and arrangement of the exemplary embodiments without departing from the spirit of the present disclosure.

What is claimed is:

1. A method, comprising:
    heating a brine to a desired temperature, the desired temperature being chosen to cause a viscosity of the brine to be reduced and to increase solubility of certain brine components in water;
    injecting the heated brine into a cool meat product, the meat product being at a temperature less than the desired temperature of the brine, such that the meat product is brought to an elevated temperature after injection, the elevated temperature being less than 140° F.;
    subsequent to injecting the heated brine into the meat product, slicing the meat product to slices of a first thickness;

applying a topical application to coat an exterior of the slices;

subsequent to applying the topical application, flattening the slices to cause the topical application to adhere to the slices and to cause the slices to become a second thickness less than the first thickness; and drying the slices to a desired moisture level.

2. A method comprising:

pumping, with a pump, a heated brine at a positive pressure, the heated brine being at a desired temperature, the desired temperature being chosen to cause a viscosity of the brine to be reduced and to increase solubility of brine components in water;

receiving, with an injector coupled to the pump, the heated brine from the pump;

injecting, with the injector, the heated brine into a cool meat product, the meat product being at a temperature less than the desired temperature of the brine, such that the meat product is brought to an elevated temperature after injection, the elevated temperature being less than 140° F.;

slicing, with a slicer, the meat product to slices of a first thickness subsequent to the heated brine being injected into the meat product, applying, with a topical applicator, a topical application to coat an exterior of the slices;

receiving, with a flattener, the slices subsequent to the topical application being applied;

flattening the slices with the flattener to cause the topical application to adhere to the slices and to cause the slices to become a second thickness less than the first thickness;

drying, with a drying over, the slices to a desired moisture level.

3. The method of claim 2, further comprising tumbling the meat product subsequent to injecting the heated brine.

4. The method of claim 3, further comprising cooling the meat product in a vacuum while tumbling the meat product to reach a desired temperature.

5. The method of claim 2, wherein the brine comprises a mixture of water, sugar, salt, and seasonings.

6. The method of claim 3, wherein the brine comprises about 64% to 74% dry ingredients by weight and a portion of the dry ingredients include at least one of sugar, salt, dextrose, fructose, and glucose.

7. The method of claim 2, wherein the brine has a viscosity in a range from 200 cp to 5100 cp at a temperature of about 40° F. and the brine has a viscosity in a range from about 70 cp to about 750 cp at the desired temperature.

8. The method of claim 2, wherein the flattening comprises conveying the slices of the first thickness with vibrating rollers positioned to press the slices to the second thickness.

9. The method of claim 2, further comprising:

grilling the slices of the second thickness;

subsequently receiving the slices in a cooling tunnel;

with the cooling tunnel, cooling the slices of the second thickness;

receiving from the cooling tunnel, with a vibratory or wire belt conveyer, the slices of the second thickness on temperature resistant screens or mat;

with the conveyer, stripping the slices of the second thickness from the temperature resistant screens or mats.

10. A method comprising:

pumping a heated brine at a positive pressure, the heated brine being at a desired temperature, the desired temperature being chosen to cause a viscosity of the brine to be reduced and to increase solubility of brine components in water;

injecting the heated brine into a cool meat product, the meat product being at a temperature less than the desired temperature of the brine, such that the meat product is brought to an elevated temperature after injection, the elevated temperature being less than 140° F.;

slicing the meat product to slices of a first thickness subsequent to the heated brine being injected into the meat product, coating an exterior of the slices;

flattening the coated slices to cause the coating to adhere to the slices and to cause the slices to become a second thickness less than the first thickness;

drying the flattened slices to a desired moisture level.

11. The method of claim 10, wherein the heated brine is injected into the cool meat product with an injector, the method comprising:

recycling brine by returning unused brine from the injector to a heat exchanger configured to re-heat the brine and after-reheating the returned brine, flowing the returned brine back into the injector for injection into a cool meat product.

12. The method of claim 10 comprising vacuum tumbling the elevated temperature meat product.

13. The method of claim 10 comprising vacuum tumbling the elevated temperature meat product with a vacuum tumbler;

flowing brine from the injector into the vacuum tumbler to intermix with the tumbling meat product.

14. The method of claim 10 comprising vibrating the coated slices while flattening the coated slices.

15. The method of claim 14 wherein the vibrating causes the coating to infiltrate into the slices.

* * * * *

UNITED STATES PATENT AND TRADEMARK OFFICE
CERTIFICATE OF CORRECTION

| | |
|---|---|
| PATENT NO. | : 11,812,756 B2 |
| APPLICATION NO. | : 15/018138 |
| DATED | : November 14, 2023 |
| INVENTOR(S) | : Kent M. Bearson et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2,008 days.

Signed and Sealed this
Sixteenth Day of July, 2024

Katherine Kelly Vidal
*Director of the United States Patent and Trademark Office*